(12) United States Patent
Zheng et al.

(10) Patent No.: US 10,203,569 B2
(45) Date of Patent: Feb. 12, 2019

(54) ARRAY SUBSTRATE AND DISPLAY PANEL

(71) Applicants: Xiamen Tianma Micro-Electronics Co., Ltd., Xiamen (CN); Tianma Micro-Electronics Co., Ltd., Shenzhen (CN)

(72) Inventors: Binyi Zheng, Xiamen (CN); Poping Shen, Xiamen (CN); Ling Wu, Xiamen (CN); Zhaodong Zhang, Xiamen (CN)

(73) Assignees: Xiamen Tianma Micro-Electronics Co., Ltd., Xiamen (CN); Tianma Micro-Electronics Co., Ltd., Shenzhen (CN)

( * ) Notice: Subject to any disclaimer, the term of this patent is extended or adjusted under 35 U.S.C. 154(b) by 9 days.

(21) Appl. No.: 14/757,674

(22) Filed: Dec. 22, 2015

(65) Prior Publication Data

US 2016/0178980 A1    Jun. 23, 2016

(30) Foreign Application Priority Data

Dec. 23, 2014 (CN) .......................... 2014 1 0811491

(51) Int. Cl.
  *G02F 1/1343* (2006.01)
  *G02F 1/1339* (2006.01)
  *G02F 1/1337* (2006.01)
  *G02F 1/1362* (2006.01)

(52) U.S. Cl.
  CPC .... *G02F 1/134363* (2013.01); *G02F 1/13394* (2013.01); *G02F 1/133707* (2013.01);
  (Continued)

(58) Field of Classification Search
  CPC . H01L 21/943; H01L 21/048; H01L 27/1251; H01L 27/124; H01L 27/1463;
  (Continued)

(56) References Cited

U.S. PATENT DOCUMENTS 6,839,117 B1    1/2005  Park et al.
7,327,431 B2 *  2/2008  Chae .................. G02F 1/133345
                                                         349/156
(Continued)

FOREIGN PATENT DOCUMENTS

CN    101162339 A    4/2008
CN    101750804 A    6/2010
(Continued)

*Primary Examiner* — Marcos D Pizarro
*Assistant Examiner* — Antonio Crite
(74) *Attorney, Agent, or Firm* — Faegre Baker Daniels LLP

(57) ABSTRACT

An array substrate including a substrate, a plurality of gate lines and a plurality of data lines disposed on the substrate, which intersect to define a plurality of pixel units, a common electrode including a planar shape disposed above the pixel units, a plurality of strip slits are disposed within a region of the common electrode that corresponds to the pixel units, major axes of a plurality of the strip slits corresponding to the same row of pixel units are parallel to each other, extension lines of the major axes of the strip slits corresponding to a row of the pixel units intersect extension lines of the major axes of the strip slits corresponding to an adjacent row of the pixel units; wherein, a first angle is defined between the major axis of one of the strip slits and a direction perpendicular to the gate lines.

15 Claims, 15 Drawing Sheets

(52) U.S. Cl.
CPC ............... *G02F 1/133784* (2013.01); *G02F 2001/134318* (2013.01); *G02F 2001/134372* (2013.01); *G02F 2001/136222* (2013.01)

(58) Field of Classification Search
CPC ............ H01L 29/4908; H01L 29/7816; H01L 51/0508; H01L 51/102; G02F 1/134363; G02F 1/136286; G02F 1/1337; G02F 1/134309
USPC .... 257/59, 68, 347, 359, 678, 687, E21.045, 257/E21.061, E21.121, E21.32, E21.411, 257/E21.527, E21.658, E21.659, E21.665; 349/84
See application file for complete search history.

(56) References Cited

U.S. PATENT DOCUMENTS

| | | | |
|---|---|---|---|
| 7,417,705 B2* | 8/2008 | Chae | G02F 1/133345 349/156 |
| 8,018,541 B2* | 9/2011 | Lee | G02F 1/136286 349/38 |
| 2010/0103360 A1* | 4/2010 | Shimomaki | G02F 1/133707 349/141 |
| 2010/0296040 A1* | 11/2010 | Han | G02F 1/134363 349/139 |
| 2014/0218670 A1* | 8/2014 | Nagano | G02F 1/133512 349/110 |
| 2015/0098042 A1* | 4/2015 | Hirosawa | G02F 1/136286 349/47 |
| 2015/0185515 A1* | 7/2015 | Yu | G02F 1/13394 349/106 |
| 2016/0124233 A1* | 5/2016 | Wei | G02B 27/22 349/126 |
| 2016/0178980 A1* | 6/2016 | Zheng | G02F 1/136286 257/390 |

FOREIGN PATENT DOCUMENTS

| | | |
|---|---|---|
| CN | 103365011 A | 10/2013 |
| JP | 201466761 A | 4/2014 |
| WO | 2012015111 A1 | 2/2012 |

* cited by examiner

ARRAY SUBSTRATE AND DISPLAY PANEL

CROSS-REFERENCE TO RELATED APPLICATION

This application claims priority to Chinese Application No. 201410811491.8, filed Dec. 23, 2014, which is herein incorporated by reference in its entirety.

TECHNICAL FIELD

The present disclosure relates to the field of display technology and, in particular, to an array substrate and a display panel including the array substrate.

BACKGROUND

With the development of display technologies, the display effect of liquid crystal display panels is being continuously improved, and the liquid crystal display panels are being employed more and more widely.

Nowadays, a liquid crystal display panel including a Fringe Field Switching (FFS) liquid crystal driving mode, i.e. an FFS liquid crystal display panel, is common. In the FFS liquid crystal display panel, the rotation of liquid crystal molecules is controlled by an electric field generated between a pixel electrode and a common electrode which are disposed in an array substrate and parallel to each other, so that the display effect of the liquid crystal display panel is achieved.

FIG. 1A illustrates a process of alignment rubbing performed on an alignment film layer disposed on a color filter substrate of the FFS liquid crystal display panel in the related art. As shown in FIG. 1A, an alignment film layer 12 is disposed on a color filter substrate 11, and support elements 13 are disposed on the alignment film layer 12.

As illustrated in FIG. 1A, the rotation of a roller 14 causes a rubbing cloth 15 to perform alignment rubbing on the alignment film layer 12 in an alignment rubbing direction X, so that the alignment film layer 12 has an alignment effect on the liquid crystal molecules in the display panel. As shown in FIG. 1B which is an enlarged schematic view of a region A in FIG. 1A, due to a blocking action applied to the rubbing cloth 15 by the support element 13 along the alignment rubbing direction X during the alignment rubbing, an incompletely rubbing aligned region B is formed at the periphery of the support element 13 in the alignment rubbing direction X. The incompletely rubbing aligned region B herein includes: a region not subjected to the rubbing alignment and a region partially subjected to the rubbing alignment, compared with a completely rubbing aligned region. Due to the presence of the incompletely rubbing aligned region B in the alignment film layer 12 subjected to the alignment rubbing, liquid crystal molecules corresponding to the incompletely rubbing aligned region B in the display panel cannot be aligned normally, resulting in a severe light leakage phenomenon when the display panel is in a black display state.

SUMMARY

In view of the above, embodiments of the disclosure provide an array substrate including:
a substrate;
a plurality of gate lines and a plurality of data lines disposed on the substrate, where the plurality of gate lines intersect the plurality of data lines to define a plurality of pixel units arranged as an array; and
a common electrode comprising a planar shape disposed above the pixel units, where a plurality of strip slits are disposed within a region of the common electrode that corresponds to the pixel units, major axes of a plurality of the strip slits corresponding to the same row of pixel units are parallel to each other, and extension lines of the major axes of the strip slits corresponding to a row of the pixel units intersect extension lines of the major axes of the strip slits corresponding to an adjacent row of the pixel units;
where in a plane comprising the common electrode, a first angle is defined between the major axis of one of the strip slits and a direction perpendicular to the gate lines, and the first angle is greater than or equal to 6° and less than or equal to 8°.

Embodiments of the disclosure further provide an array substrate, including:
a substrate; and
a plurality of gate lines and a plurality of data lines disposed on the substrate, where the plurality of gate lines intersect the plurality of data lines to define a plurality of pixel units that are arranged as an array;
where each of the pixel units includes a strip-shaped pixel electrode, including a plurality of strip slits, where major axes of a plurality of the strip slits in the pixel electrode at the same row of pixel units are parallel to each other, and extension lines of the major axes of the strip slits in the pixel electrodes at a row of pixel units intersect extension lines of the major axes of the strip slits in the pixel electrodes at an adjacent row of pixel units;
where in a plane comprising the pixel electrodes, a first angle is defined between the major axis of the strip slit in each of the pixel electrodes and a direction perpendicular to the gate lines, and the first angle is greater than or equal to 6° and less than or equal to 8°.

Embodiments of the disclosure further provide a display panel, including a color filter substrate and an array substrate of the above various embodiments that is disposed opposite to the color filter substrate, where a second alignment film layer and a support element are disposed at a side of the color filter substrate that is close to the array substrate, and a first region that is incompletely rubbing aligned is disposed in the second alignment film layer at the periphery of the support element in an alignment rubbing direction.

The array substrate and the display panel, according to embodiments of the disclosure can decrease the number of liquid crystal molecules that cannot be aligned normally in the display panel and thus the light leakage phenomenon of the display panel and display device in a black display state can be alleviated by the following means: the plurality of strip slits are disposed within a region of the common electrode that corresponds to the pixel unit, where the major axes of a plurality of the strip slits corresponding to the same row of pixel units are parallel to each other, and the extension lines of the major axes of the strip slits corresponding to a row of the pixel units intersect extension lines of the major axes of the strip slits corresponding to an adjacent row of the pixel units, and in the plane comprising the common electrode, the first angle is defined between the major axis of one of the strip slits and a direction perpendicular to the gate lines; or the plurality of strip slits are disposed in the pixel electrode, where the major axes of a plurality of the strip slits in the pixel electrodes at the same row of pixel units are parallel to each other, and the extension lines of the major axes of the strip slits in the pixel electrodes at a row of pixel units intersect extension lines of the major axes of the strip slits in the pixel electrodes at an adjacent row of pixel units; and in the plane comprising the pixel electrode, the first angle is formed between the major axis of one of the strip slits and a direction perpendicular to the gate lines; and then setting the first angle to be greater than or equal to 6° and less than or equal to 8°.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

Other features, objects and advantages of the disclosure will become apparent in combination with detailed description of non-limiting embodiments made with reference to the following accompanying drawings, in which.

Figure 1A:
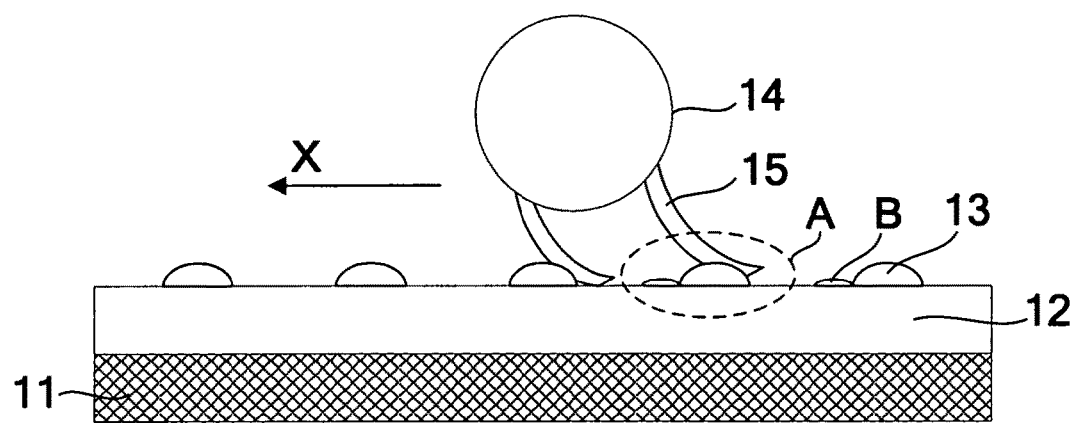
FIG. 1A is a schematic view illustrating alignment rubbing performed on an alignment film layer disposed on a color filter substrate in the related art.
Figure 1B:
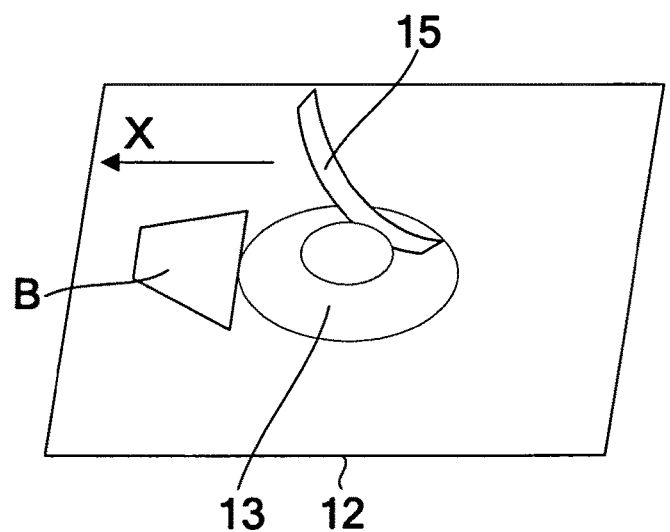
FIG. 1B is an enlarged view of a region A in FIG. 1A.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

The disclosure will be described in detail hereinafter with reference to the accompanying drawings and embodiments. It should be appreciated that the specific embodiments described herein are merely given for explaining the disclosure, but not limiting the disclosure. Further, it also should be appreciated that only the relevant parts associated with the disclosure, rather than all parts, are shown in the accompanying drawings for ease of description.

Figure 2:
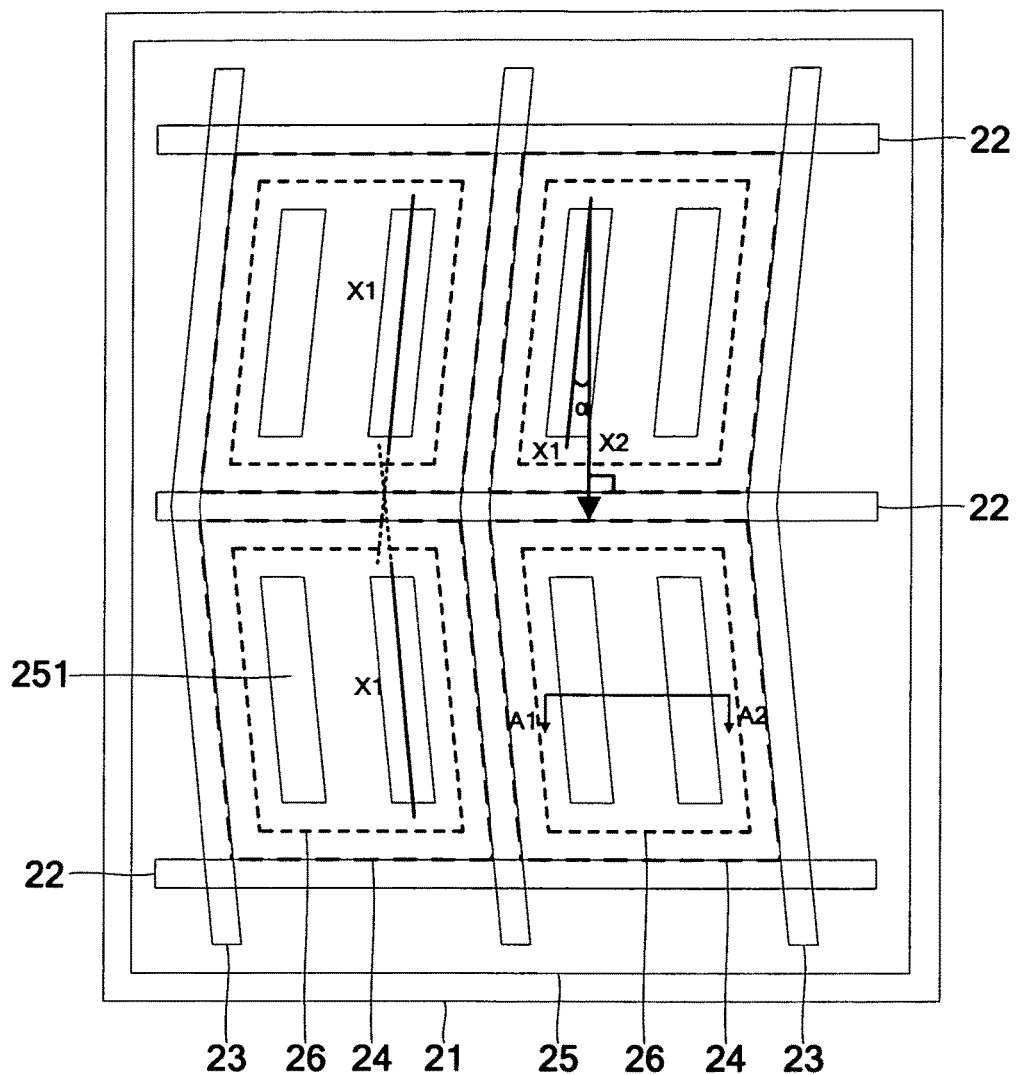
FIG. 2 is a schematic view showing a structure of an array substrate, according to embodiments of the disclosure.

Embodiments of the disclosure provide an array substrate. As shown in FIG. 2, which is a schematic view showing a structure of the array substrate, according to embodiments of the disclosure, the array substrate includes: a substrate 21; a plurality of gate lines 22 and a plurality of data lines 23 disposed on the substrate 21, where the plurality of gate lines 22 intersect the plurality of data lines 23 to define a plurality of pixel units 24 that are arranged as an array; and a common electrode 25 disposed above the pixel units 24 and comprising a planar shape, where a plurality of strip slits 251 are disposed within regions of the common electrode 25 that correspond to the pixel units 24, major axes X1 of a plurality of the strip slits 251 corresponding to the same row of pixel units 24 are parallel to each other, and extension lines of the major axes X1 of the strip slits 251 corresponding to any row of pixel units 24 intersect extension lines of the major axes X1 of the strip slits 251 corresponding to an adjacent row of pixel units 24; and in a plane comprising the common electrode 25, a first angle α is defined between the major axis of each strip slit 251 and a direction X2 perpendicular to the gate line 22, where the first angle α is greater than or equal to 6° and less than or equal to 8°.

It is noted that, in describing the embodiments of the disclosure, a direction from the substrate 21 to the common electrode 25 is defined as an upward direction, and a direction from the common electrode 25 to the substrate 21 is defined as a downward direction. Terms "above" and "below" are only for describing the orientations of objects but not for limiting the structures of the objects.

As shown in FIG. 2, the major axes X1 of a plurality of the strip slits corresponding to the same row of pixel units 24, are parallel to each other, and the extension lines of the major axes X1 of the strip slits 251 corresponding to any two adjacent rows of pixel units 24 intersect each other, in this way a region of the common electrode 25 corresponding to each of the pixel units 24 forms a pseudo dual-domain pixel structure.

As mentioned above, an incompletely rubbing aligned region is formed at the periphery of the support element in the alignment rubbing direction due to the blocking action applied to a rubbing cloth by the support element, when the alignment rubbing is performed on an alignment film layer disposed on the color filter substrate, and a ratio of the area of a region of the common electrode 25 corresponding to the pixel unit 24, that is occupied by an orthogonal projection of the incompletely rubbing aligned region onto the array substrate, to the area of the incompletely rubbing aligned region is defined as an effective area ratio of the incompletely rubbing aligned region. An increased effective area ratio of the incompletely rubbing aligned region means that the area of the region of the common electrode 25 corresponding to the pixel unit 24 that is occupied by the orthogonal projection of the incompletely rubbing aligned region onto the array substrate is increased, and accordingly more liquid crystal molecules cannot be aligned normally due to the impact of the incompletely rubbing aligned region, in this way the light leakage phenomenon of the display panel becomes more serious.

Figure 3:
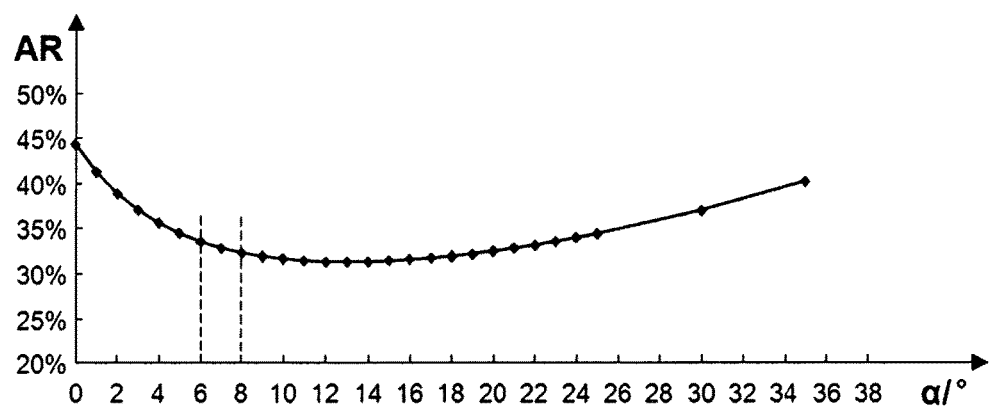
FIG. 3 is a graph illustrating a relationship between an effective area ratio of an incompletely rubbing aligned region and a first angle, according to embodiments of the disclosure.

FIG. 3 is a graph illustrating the relationship between an effective area ratio of the incompletely rubbing aligned region and the first angle, according to embodiments of the disclosure. As shown in FIG. 3, the ordinate axis represents the effective area ratio AR of the incompletely rubbing aligned region, and the abscissa axis denotes the first angle α. As illustrated in FIG. 3, under the condition that the first angle α is less than or equal to 8°, the effective area ratio AR of the incompletely rubbing aligned region decreases when the first angle α increases. In this way, in the embodiments of the disclosure, the effective area ratio AR of the incompletely rubbing aligned region can be decreased effectively by setting the first angle α to be larger than or equal to 6° and less than or equal to 8°. Consequently, the liquid crystal molecules that are not aligned normally due to the impact of the incompletely rubbing aligned region are reduced, in this way the light leakage phenomenon of the display panel in a black display state can be alleviated.

As described above, the first angle α is set to be greater than or equal to 6° and less than or equal to 8°, but this is only an example of the disclosure. In another example, the first angle α may be alternatively set to be greater than or equal to 7° and less than or equal to 8°. It can be seen from FIG. 3 that the light leakage phenomenon of the display panel in a black display state can be alleviated by setting the first angle α to be greater than or equal to 7° and less than or equal to 8°.

Figure 4:
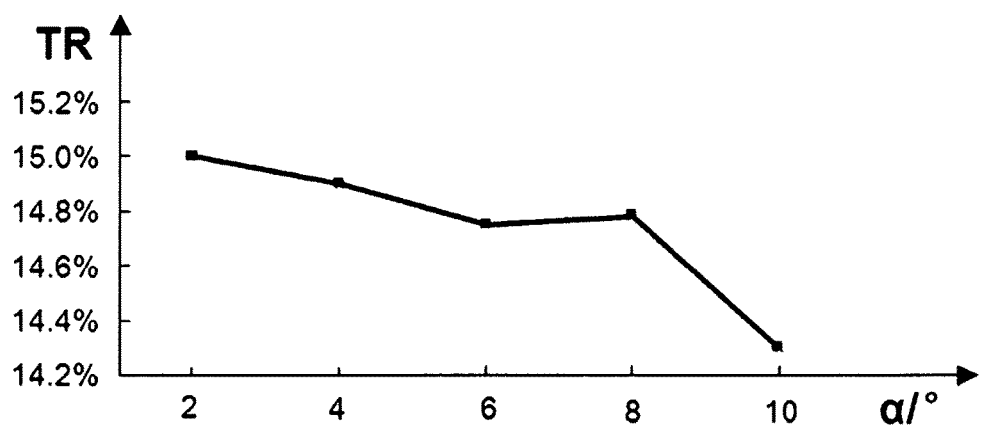
FIG. 4 is a graph illustrating a relationship between a light transmittance and the first angle, according to embodiments of the disclosure.

FIG. 4 is a graph illustrating the relationship between a light transmittance and the first angle, according to embodiments of the disclosure. As shown in FIG. 4, the ordinate axis denotes the light transmittance TR of the display panel in a white display state, and the abscissa axis denotes the first angle α. As illustrated in FIG. 4, the light transmittance TR of the display panel in the white display state decreases as the first angle α increases from 2° to 6°, while the light transmittance TR of the display panel in the white display state increases as the first angle α increases from 6° to 8°. As a result, when the first angle α is set to be greater than or equal to 7° and less than and equal to 8°, the light leakage phenomenon of the display panel in the black display state can be alleviated, and the light transmittance of the display panel in the white display state can be ensured as the first angle α increases.

According to a further example of the disclosure, the first angle α may be set to be 8°. As shown in FIG. 3, the effective area ratio AR of the incompletely rubbing aligned region can be decreased more effectively if the first angle α, which is greater than or equal to 6° and less than or equal to 8°, is selected to be 8°. Accordingly, the liquid crystal molecules that are not aligned normally due to the impact of the incompletely rubbing aligned region can be much more reduced. In this way, the light leakage phenomenon of the display panel in the black display state can be significantly alleviated, and the light transmittance of the display panel in the white display state can be better ensured as the first angle α increases.

Further, as illustrated in FIG. 2, the strip slits 251 corresponding to any row of pixel units 24 are disposed symmetrically with the strip slits 251 corresponding to an adjacent row of pixel units 24 with respect to the gate line 22. In the array substrate as shown in FIG. 2, the strip slits 251 are arranged in such a manner to form a pseudo dual-domain pixel structure, as described above. As such, by disposing the strip slits 251 corresponding to any two adjacent rows of pixel units 24 to be symmetric with each other with respect to the gate line 22, the pseudo dual-domain pixel structure is formed by the orderly arrangement of the strip slits 251, which is advantageous to design and fabricate not only the pseudo dual-domain pixel structure but also other structures in the array substrate. Nevertheless, in other examples, the strip slits corresponding to any two adjacent rows of pixel units may not be symmetrically disposed with respect to the gate line, as long as the strip slits are arranged in such a manner to form the pseudo dual-domain pixel structure, and the disclosure is not limited thereto.

Figure 5:
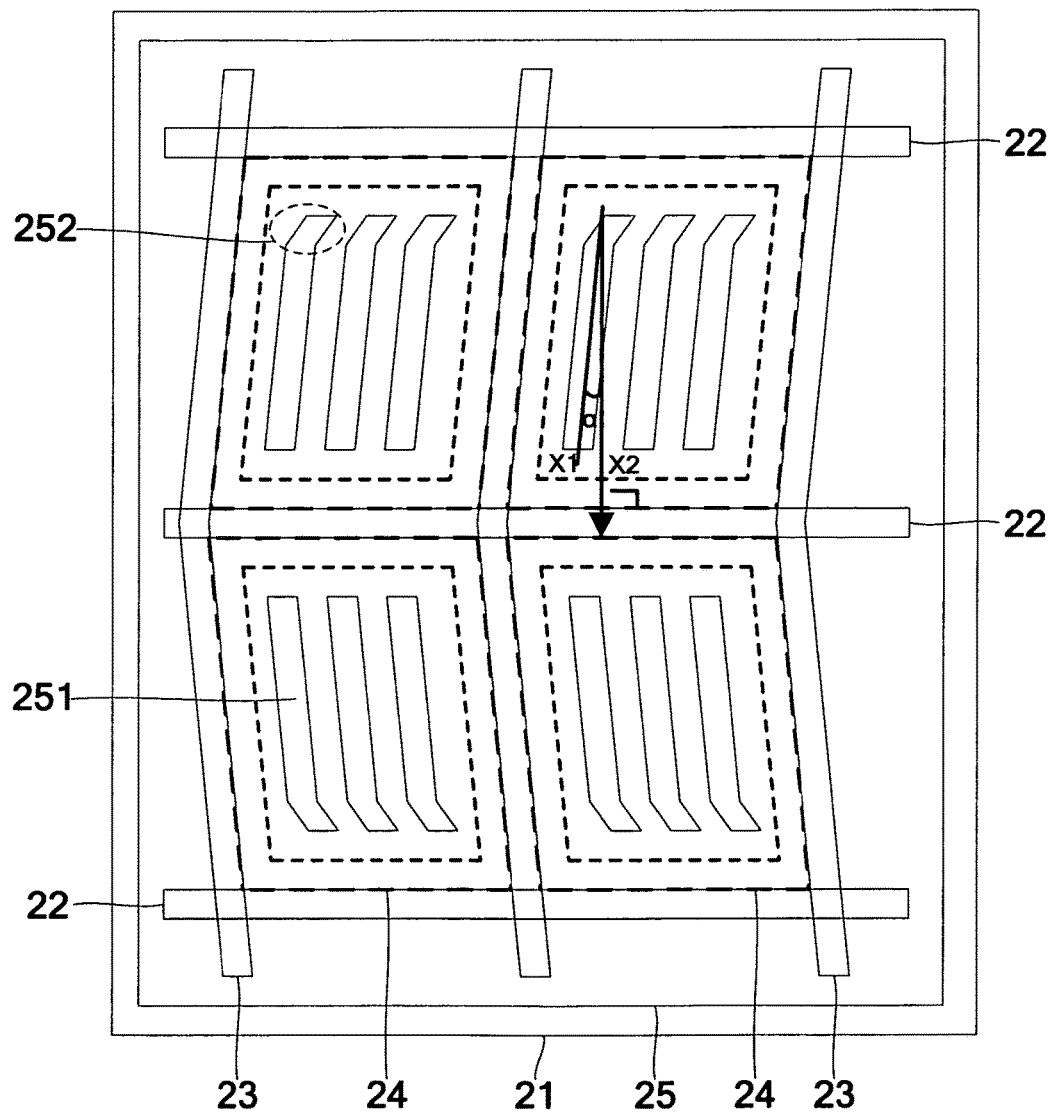
FIG. 5 is a schematic view showing a structure of another array substrate, according to embodiments of the disclosure.

As shown in FIG. 2, there are two strip slits 251 in a region of the common electrode 25 that corresponds to each of the pixel units 24, and this is only an example of arranging the strip slits in the region of the common electrode 25 corresponding to each of the pixel units 24. According to other examples, three or four strip slits may be disposed in a region of the common electrode corresponding to each of the pixel units. As shown in FIG. 5, for example, three strip slits 251 are disposed in a region of the common electrode 25 corresponding to each of the pixel units 24, and as shown in FIG. 6, four strip slits 251 are disposed in a region of the common electrode 25 corresponding to each of the pixel units 24.

According to embodiments of the disclosure, as shown in FIG. 2, no bent portion is disposed at an end of the strip slit 251. As shown in FIG. 5, a bent portion 252 is disposed at an end of the strip slit 251. A bent portion 252 is disposed at an upper end of each strip slit 251 at the first row of pixel units and a bent portion 252 is disposed at a lower end of each strip slit 251 at the second row of pixel units, or alternatively a bent portion 252 is disposed at a lower end of each strip slit 251 at the first row and a bent portion 252 is disposed at an upper end of each strip slit 251 at the second row, which is not limited in the disclosure. As shown in FIG. 6, two bent portions 252, which deflect toward two different directions, are respectively disposed at both ends of the strip slit 251, i.e., the bent portion 252 at the upper end of the strip slit 251 deflects toward the right side of the strip slit 251, and the bent portion 252 at the lower end of the strip slit 251 deflects toward the left side of the strip slit 251, or vice versa.

Figure 6:
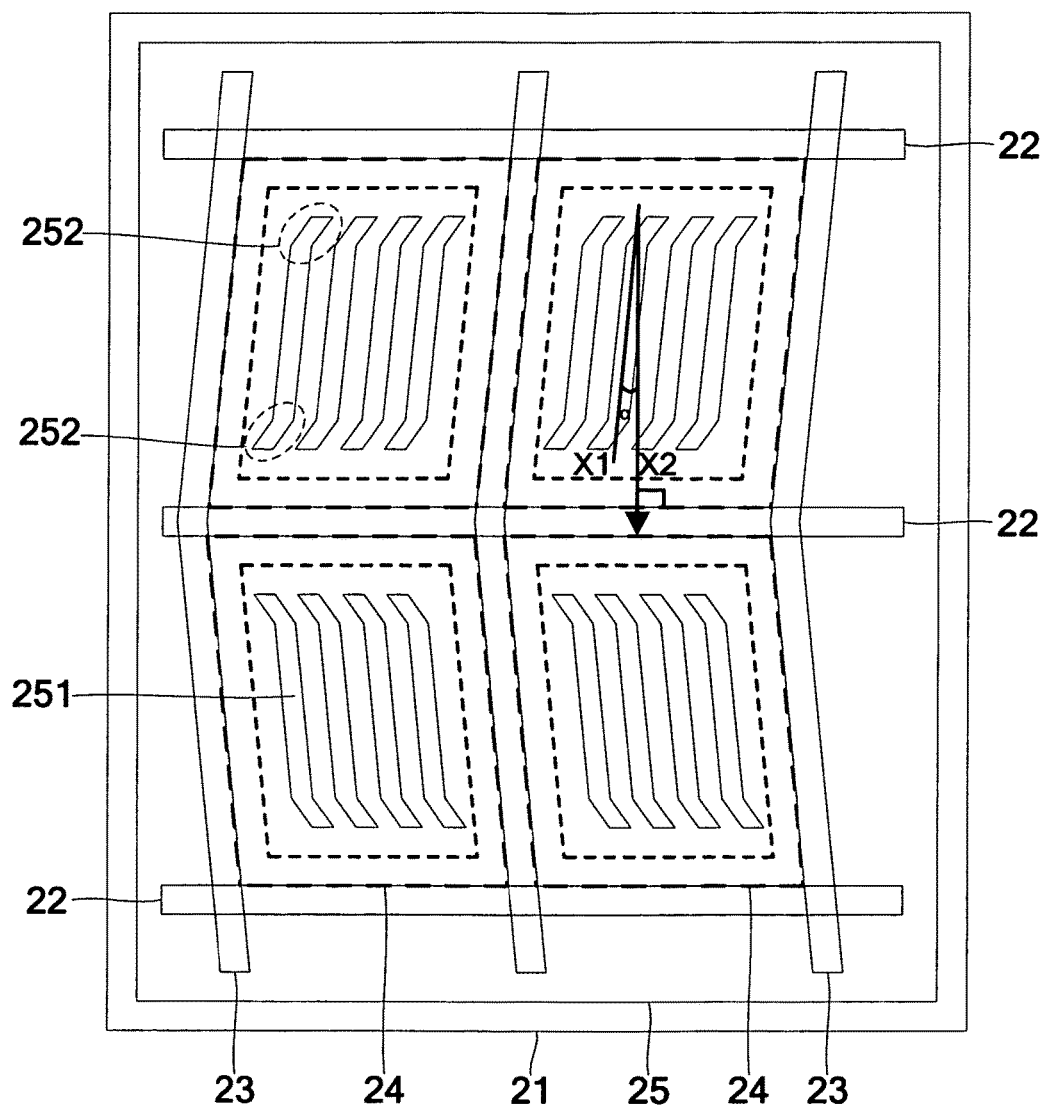
FIG. 6 is a schematic view showing a structure of yet another array substrate, according to embodiments of the disclosure.

It is to be noted that the array substrates illustrated in FIGS. 2, 5 and 6 are only some examples of the disclosure. Furthermore, the number of strip slits included in the region of the common electrode corresponding to the pixel electrode in the array substrate, the presence of the bent portion at the end of the strip slit, and the number and deflecting angle of bent portion are not limited herein.

In embodiments of the disclosure, the strip slit 251 comprises a parallelogrammic shape, as shown in FIG. 2. As shown in FIGS. 5 and 6, despite the presence of the bent portion 252 at an end of the strip slit 251, an area of the strip slit 251 that is occupied by the bent portion 252 is insignificant and the position of the bent portion 252 is at the end of the strip slit 251, in this way the bent portion 252 has a little impact on the shape of the strip slit 251, and hence the shape of the strip slit 251 may be still regarded as a parallelogram. The strip slit 251 in embodiments of the disclosure is easy to fabricate for comprising the parallelogrammic shape, that is, the first angle α is defined between the major axis X1 of the strip slit 251 and the direction X2 perpendicular to the gate line 22.

Figure 7:
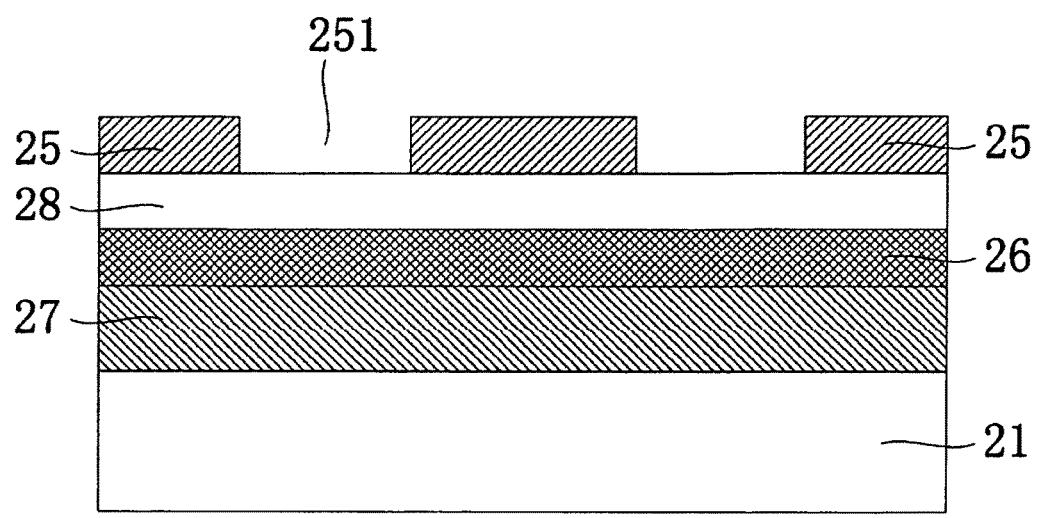
FIG. 7 is a schematic sectional view of the array substrate taken along a direction A1-A2 in FIG. 2, according to embodiments of the disclosure.

As illustrated in FIGS. 2, 5 and 6, the array substrate further includes a plurality of pixel electrodes 26, which are disposed between the common electrode 25 and the substrate 21 and are electrically insulated from the common electrode 25. As shown in FIG. 7, which is a schematic sectional view taken along a direction A1-A2 in FIG. 2, a thin-film transistor film layer 27 is disposed on the substrate 21, the pixel electrodes 26 are disposed on the thin-film transistor film layer 27, and the common electrode 25 is disposed above the pixel electrodes 26 and is electrically insulated from the common electrodes 25 via a first insulation layer 28. Since both the pixel electrodes 26 and the common electrode 25 are positioned at different layers in the array substrate, the resultant array substrate is one as required by the FFS display panel. Again, the pixel electrodes 26 are disposed between the common electrode 25 and the substrate 21, the resultant array substrate discussed in the above embodiments is an array substrate in which the common electrode is disposed above the pixel electrodes.

Figure 8:
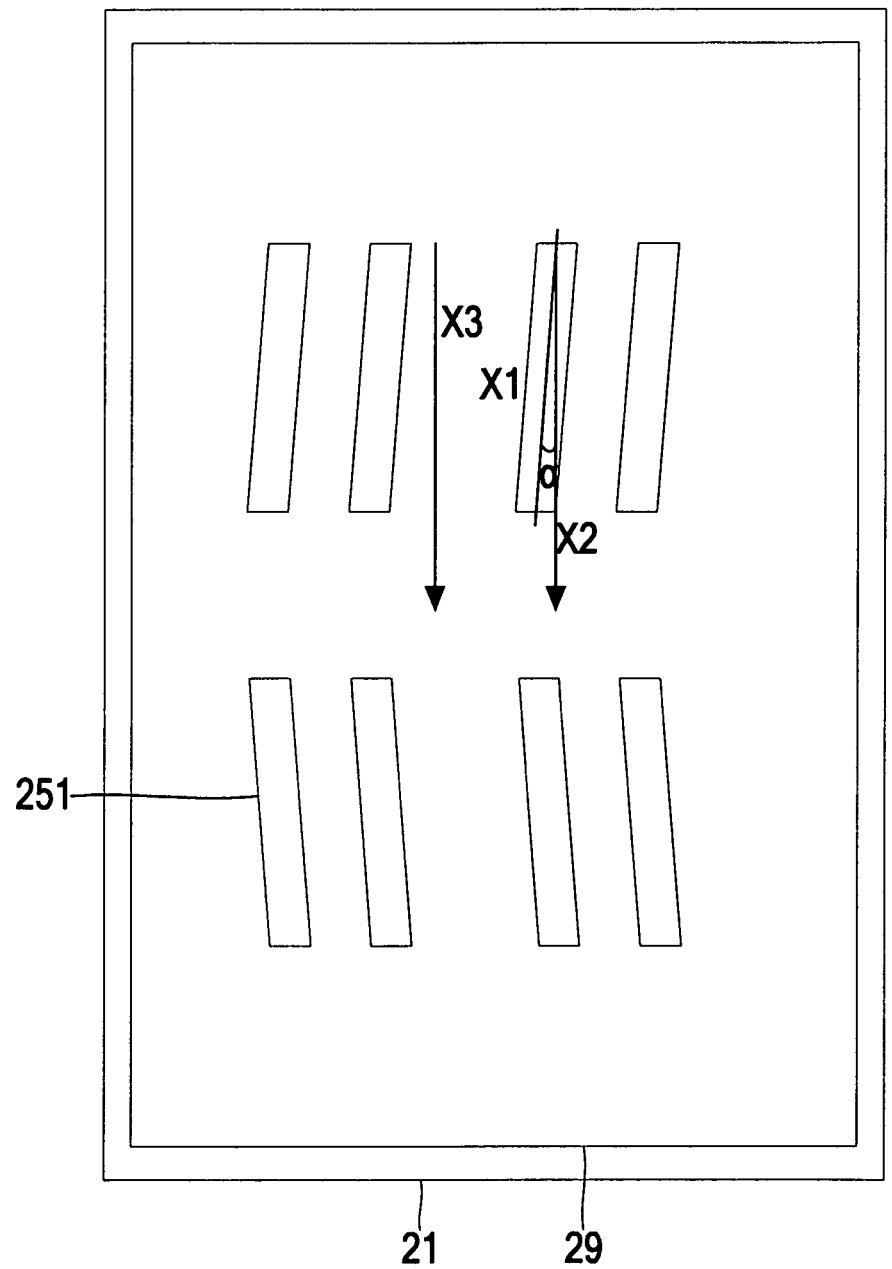
FIG. 8 is a schematic view showing a structure of a further array substrate, according to embodiments of the disclosure.

In embodiments of the disclosure, as shown in FIG. 8 based on the array substrate as shown in FIG. 2, the array substrate shown in FIG. 8 further includes a first alignment film layer 29 disposed on a surface of the common electrode that is away from the substrate 21, where an alignment rubbing direction X3 in which the alignment rubbing is performed on the first alignment film layer 29 is parallel to a direction X2 perpendicular to the gate lines in a plane comprising the common electrode. It is noted that FIG. 8, in which the strip slits 251 in the common electrode are represented by dashed lines, shows that the first alignment film layer 29 is disposed on the surface of the common electrode that is away from the substrate.

A structure of the array substrate in which the common electrode is disposed above the pixel electrode is described in the above embodiments, and such array substrate is applicable to the FFS display panel. In an alternative array substrate, the common electrode may be disposed between the pixel electrode and the substrate, that is, the common electrode is disposed below the pixel electrode, and such array substrate is also applicable to the FFS display panel, and is described below in the following embodiments.

Figure 9:
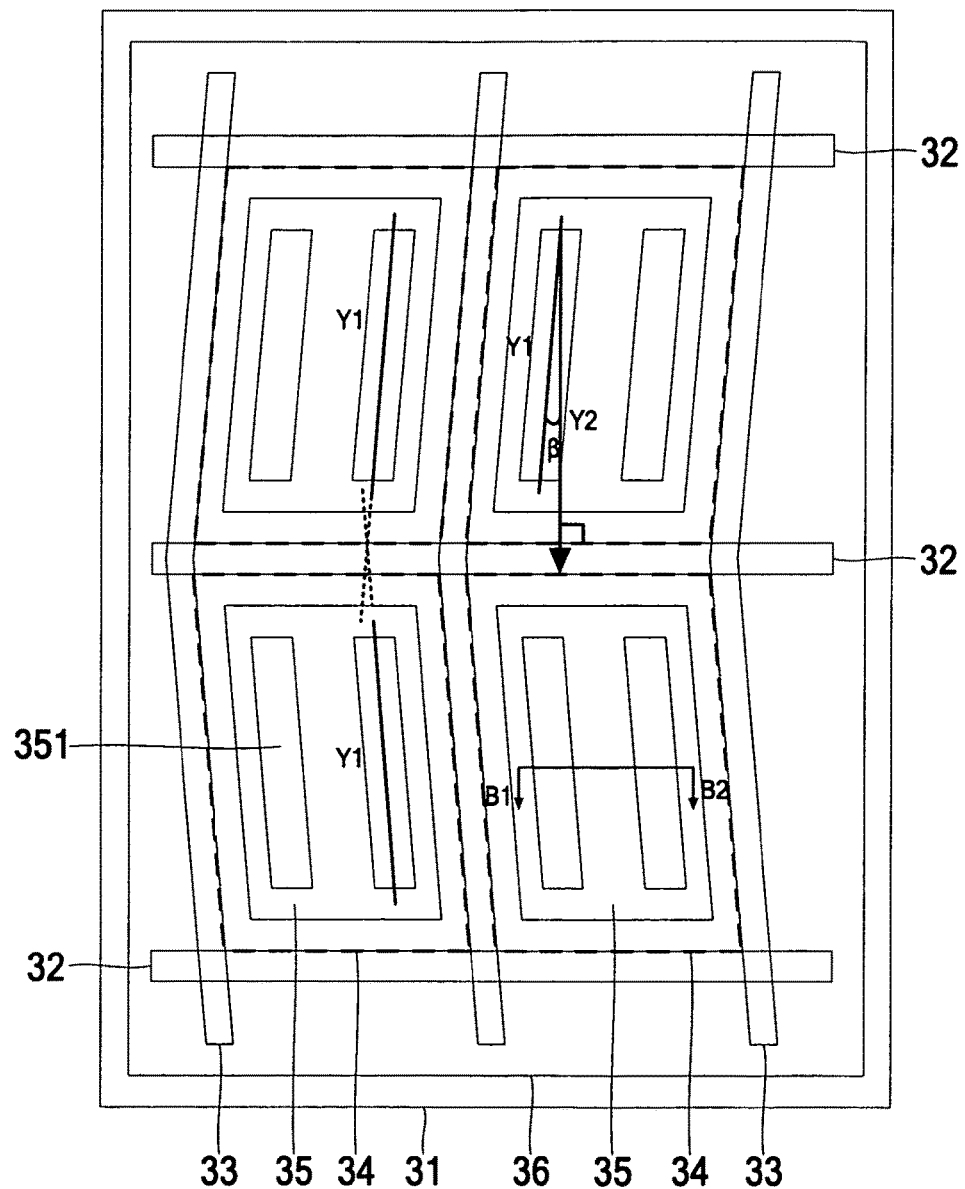
FIG. 9 is a schematic view showing a structure of a further array substrate, according to embodiments of the disclosure.

As shown in FIG. 9, the array substrate includes a substrate 31, and a plurality of gate lines 32 and a plurality of data lines 33 disposed on the substrate 31. The plurality of gate lines 32 intersect the plurality of data lines 33 to define a plurality of pixel units 34 that are arranged as an array, and each of the pixel units 34 includes a strip-shaped pixel electrode 35 including a plurality of strip slits 351. Particularly, major axes Y1 of a plurality of the strip slits 351 in the pixel electrodes 35 at the same row of pixel units 34 are parallel to each other, and extension lines of the major axes Y1 of the strip slits 351 in the pixel electrodes 35 at any row of pixel units 34 intersect extension lines of the major axes Y1 of the strip slits 351 in the pixel electrodes 35 at an adjacent row of pixel units 34. Further, in a plane in which the pixel electrodes 35 are located, a first angle β, which is greater than or equal to 6° and less than or equal to 8°, is defined between the major axis Y1 of the strip slit 351 in each of the pixel electrodes 35 and a direction Y2 perpendicular to the gate line 32.

In accordance with embodiments of the disclosure, it should be noted that a direction from the substrate 11 to the common electrode 35 is defined as an upward direction, and a direction reverse to the upward direction is defined as a downward direction. However, terms "above" and "below" are only for describing the orientations of objects but not for limiting the structures of the objects.

As shown in FIG. 9, the major axes Y1 of a plurality of the strip slits 351 in the pixel electrodes 35 of the same row of pixel units 34 are parallel to each other, and the extension lines of the major axes Y1 of the strip slits 351 in the pixel electrodes 35 at any two adjacent rows of pixel units 34 intersect each other, so that the pixel electrodes 35 in the array substrate form the pseudo dual-domain pixel structure.

As mentioned above, an incompletely rubbing aligned region is formed at the periphery of the support element in the alignment rubbing direction due to the blocking action applied to the rubbing cloth by the support element, when the alignment rubbing is performed on the alignment film layer disposed on the color filter substrate, and a ratio of the area of a region of the pixel electrodes 35, that is occupied by an orthogonal projection of the incompletely rubbing aligned region onto the array substrate, to the area of the incompletely rubbing aligned region is defined as an effective area ratio of the incompletely rubbing aligned region. An increased effective area ratio of the incompletely rubbing aligned region means that the area of the region of the pixel electrodes 35 that is occupied by the orthogonal projection of the incompletely rubbing aligned region onto the array substrate is increased, and accordingly more liquid crystal molecules cannot be aligned normally due to the impact of the incompletely rubbing aligned region, in this way the light leakage phenomenon of the display panel becomes more serious.

Figure 10:
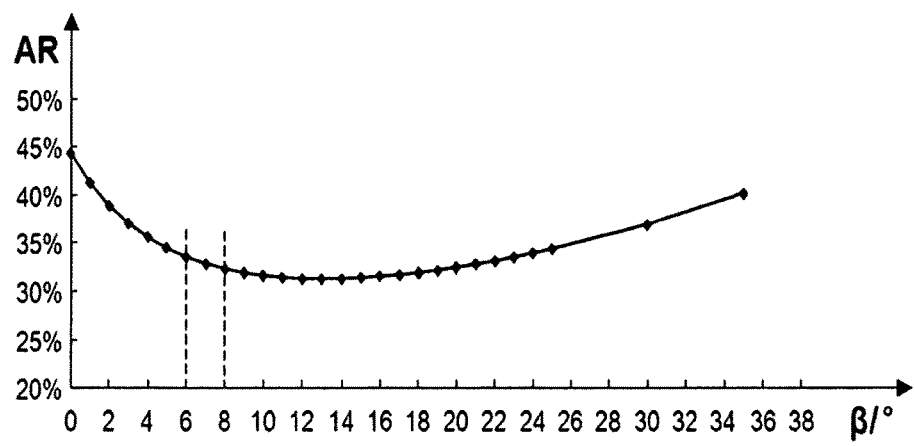
FIG. 10 is another graph illustrating the relationship between an effective area ratio of an incompletely rubbing aligned region and the first angle, according to embodiments of the disclosure.

FIG. 10 is another graph illustrating the relationship between an effective area ratio of an incompletely rubbing aligned region and the first angle, according to embodiments of the disclosure. The definition of the effective area ratio of the incompletely rubbing aligned region may refer to the above embodiments and will not be repeated herein. As shown in FIG. 10, the ordinate axis denotes the effective area ratio AR of the incompletely rubbing aligned region, and the abscissa axis denotes the first angle β. As illustrated in FIG. 10, under the condition that the first angle β is less than or equal to 8°, the effective area ratio AR of the incompletely rubbing aligned region decreases when the first angle β increases. In this way, in embodiments of the disclosure, the effective area ratio AR of the incompletely rubbing aligned region can be decreased effectively by setting the first angle β to be larger than or equal to 6° and less than or equal to 8°, so that the liquid crystal molecules which are not aligned normally due to the impact of the incompletely rubbing aligned region are reduced, in this way the light leakage phenomenon of the display panel in a black display state can be alleviated.

As discussed above, the first angle β is set to be greater than or equal to 6° and less than or equal to 8°, but this is only a specific example of the disclosure. In another specific example, the first angle β may be set to be greater than or equal to 7° and less than or equal to 8°. It can be seen from FIG. 10 that the light leakage phenomenon of the display panel in a black display state can be alleviated by setting the first angle β to be greater than or equal to 7° and less than or equal to 8°.

Figure 11:
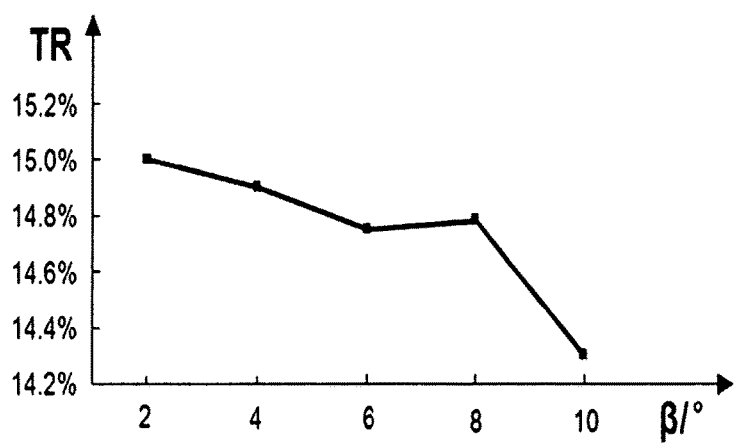
FIG. 11 is another graph illustrating the relationship between the light transmittance and the first angle, according to embodiments of the disclosure.

FIG. 11 is another graph illustrating the relationship between the light transmittance and the first angle, according to embodiments of the disclosure. As shown in FIG. 11, the ordinate axis denotes the light transmittance TR of the display panel in a white display state, and the abscissa axis denotes the first angle β. As illustrated in FIG. 11, the light transmittance TR of the display panel in the white display state decreases as the first angle β increases from 2° to 6°, while the light transmittance TR of the display panel in the white display state increases as the first angle β increases from 6° to 8°. As a result, when the first angle β is set to be greater than or equal to 7° and less than and equal to 8°, the light leakage phenomenon of the display panel in the black display state can be alleviated, and the light transmittance of the display panel in the white display state can be ensured when the first angle β increases.

According to a further example of the disclosure, the first angle β may be set to be 8°. As shown in FIG. 10, the effective area ratio AR of the incompletely rubbing aligned region can be decreased more effectively if the first angle β, which is greater than or equal to 6° and less than or equal to 8°, is selected to be 8°. Accordingly, the liquid crystal molecules that are not aligned normally due to the impact of the incompletely rubbing aligned region can be much more reduced. In this way, the light leakage phenomenon of the display panel in the black display state can be significantly alleviated, and the light transmittance presented of the display panel in the white display state can be better ensured when the first angle β increases.

Further, as illustrated in FIG. 9, the strip slits 351 in the pixel electrodes 35 of any row of pixel units 34 are disposed symmetrically with the strip slits 351 in the pixel electrodes 35 of an adjacent row of pixel units 34 with respect to the gate line 32. In the array substrate as shown in FIG. 9, the strip slits 351 are arranged in such a manner to form a pseudo dual-domain pixel structure, as described above. In this way, by arranging the strip slits 351 in the pixel electrodes 35 of any two adjacent rows of pixel units 34 to be symmetric with each other with respect to the gate line 32, the pseudo dual-domain pixel structure is formed by the orderly arrangement of the strip slits 351, which is advantageous to design and fabricate not only the pseudo dual-domain pixel structure but also other structures in the array substrate. However, in other examples, the strip slits in the pixel electrodes of any two adjacent rows of pixel units may not be symmetrically disposed with respect to the gate line, as long as the strip slits are arranged in such a manner to form the pseudo dual-domain pixel structure, and the disclosure is not limited thereto.

Figure 12:
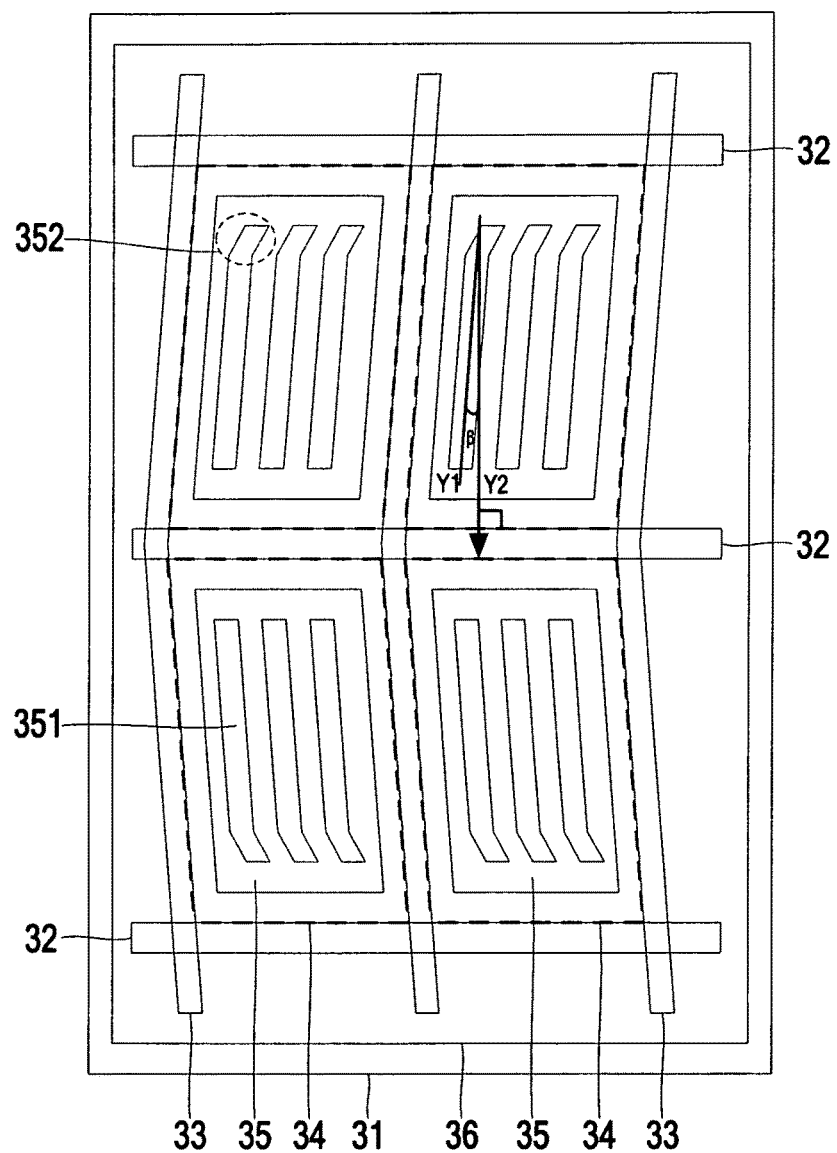
FIG. 12 is a schematic view showing a structure of a further array substrate, according to embodiments of the disclosure.

As shown in FIG. 9, there are two strip slits 351 in each pixel electrode 35, and this is only an example of the arrangement of the strip slits in each pixel electrode. In other examples, three or four strip slits may be disposed in each pixel electrode. As shown in FIG. 12, for example, three strip slits 351 are disposed in each pixel electrode 35, and as shown in FIG. 13, four strip slits 351 are disposed in each pixel electrode 35.

According to embodiments of the disclosure, no bent portion is disposed at an end of the strip slit 351, as shown in FIG. 9. As shown in FIG. 12, however, a bent portion 352 is disposed at an end of the strip slit 351. A bent portion 352 is disposed at an upper end of each strip slit 351 at the first row of pixel units and a bent portion 352 is disposed at a lower end of each strip slit 351 at the second row of pixel units. As shown in FIG. 13, two bent portions 352, which deflect toward two different directions, are respectively disposed at both ends of the strip slit 351, i.e., the bent portion 352 at the upper end of the strip slit 351 deflects toward the right side of the strip slit 351 and the bent portion 352 at the lower end of the strip slit 351 deflects toward the left side of the strip slit 351.

Figure 13:
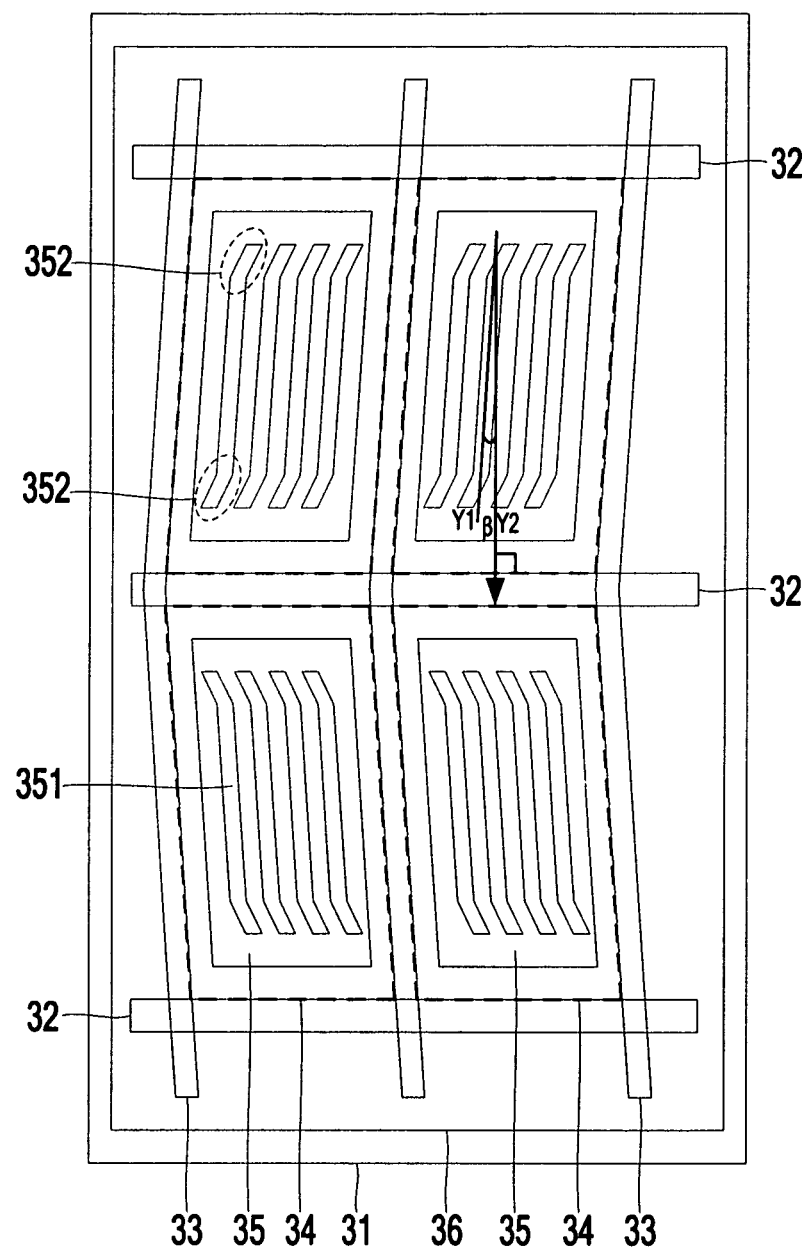
FIG. 13 is a schematic view showing a structure of a yet further array substrate, according to embodiments of the disclosure.

It is to be noted that the array substrates illustrated in FIGS. 9, 12 and 13 are only some examples of the disclosure. Furthermore, the number of strip slits included in the pixel electrode in the array substrate, the presence of the bent portion at the end of the strip slit, and the number and deflecting angle of the bent portions are not limited herein.

According to embodiments of the disclosure, the strip slit 351 comprises a parallelogrammic shape, as shown in FIG. 9. As shown in FIGS. 12 and 13, despite the presence of the bent portion 352 at an end of the strip slit 351, an area of the strip slit 351 that is occupied by the bent portion 352 is insignificant and the position of the bent portion 352 is at the end of the strip slit 351, in this way the bent portion 352 has a little impact on the shape of the strip slit 351, and hence the shape of the strip slit 351 may be still regarded as a parallelogram. The strip slit 351 in embodiments of the disclosure is easy to fabricate for comprising the parallelogrammic shape, that is, the first angle β is defined between the major axis Y1 of the strip slit 251 and the direction Y2 perpendicular to the gate line 22.

Figure 14:
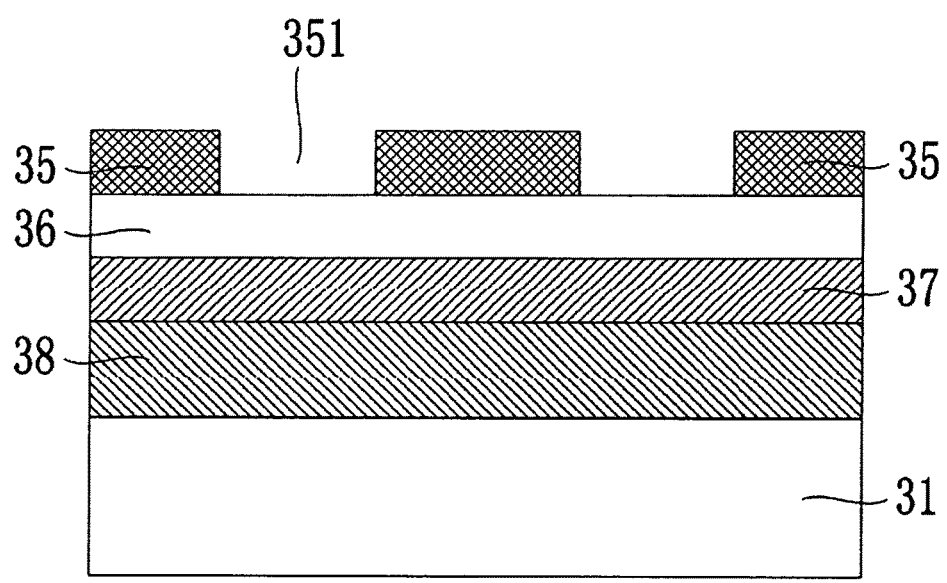
FIG. 14 is a schematic sectional view of the array substrate taken along a direction B1-B2 in FIG. 9, according to embodiments of the disclosure.

FIG. 14 is a schematic sectional view taken along a direction B1-B2 in FIG. 9. As shown in FIG. 14, the array substrate further includes a planar common electrode 37. Particularly, the common electrode 37 is disposed between the pixel electrode 35 and the substrate 31 and is electrically insulated from the pixel electrode 35 via a first insulation layer 36. Further, as illustrated in FIG. 14, the array substrate further includes a thin-film transistor film layer 38 disposed between the substrate 31 and the common electrode 37. Since the pixel electrode 35 and the common electrode 37 are positioned at different layers in the array substrate, as shown in FIG. 14, the array substrate is applicable to the FFS display panel. Again, the pixel electrode 35 is disposed between the common electrode 37 and the substrate 31, so that the array substrate described in the above embodiments may be used as an array substrate in which the common electrode is disposed below the pixel electrode.

Figure 15:
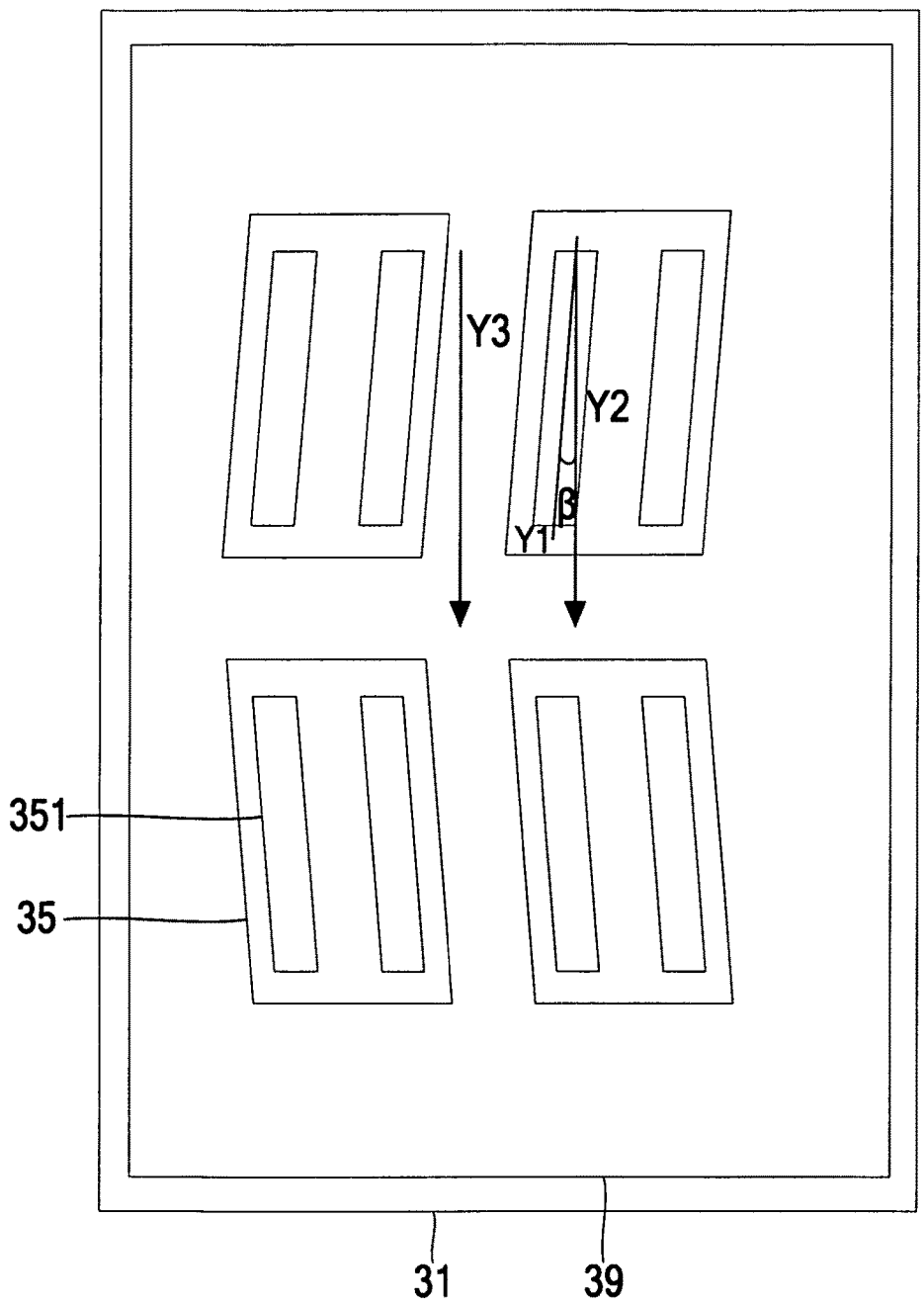
FIG. 15 is a schematic view showing a structure of a further array substrate, according to embodiments of the disclosure.

In embodiments of the disclosure, as shown in FIG. 15 based on the array substrate as shown in FIG. 9, the array substrate as shown in FIG. 15 further includes a first alignment film layer 39 disposed on a surface of the pixel electrode 35 that is away from the substrate 31, where an alignment rubbing direction Y3 in which the alignment rubbing is performed on the first alignment film layer 39 is parallel to a direction Y2 perpendicular to the gate lines in a plane comprising the pixel electrodes 35.

Figure 16:
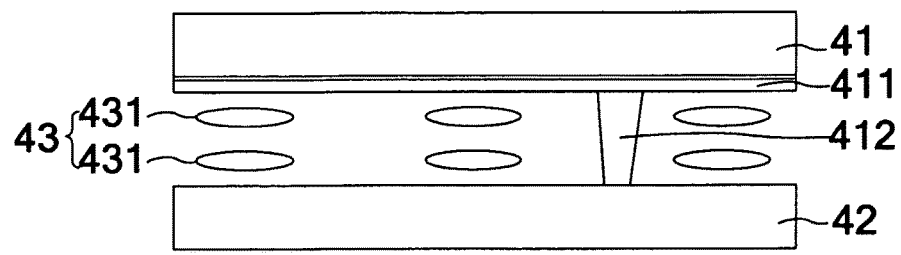
FIG. 16 is a schematic view showing a structure of a display panel, according to embodiments of the disclosure.
Figure 17:
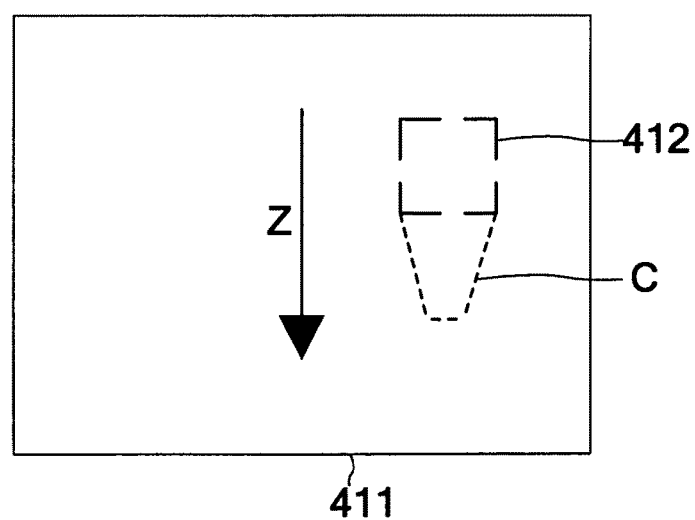
FIG. 17 is a schematic top view of a second alignment film layer and a support element in FIG. 16, according to embodiments of the disclosure.

Embodiments of the disclosure further provide a display panel. As shown in FIG. 16 which is a schematic view showing a structure of a display panel, according to embodiments of the disclosure, the display panel includes a color filter substrate 41 and an array substrate 42 disposed opposite to the color filter substrate 41, where the array substrate 42 is the array substrate as set forth in the above embodiments. A second alignment film layer 411 and a support element 412 are disposed at a side of the color filter substrate 41 that is close to the array substrate 42. As shown in FIG. 17, a first region C that is incompletely rubbing aligned is disposed in the second alignment film layer 411 at the periphery of the support element 412 along the alignment rubbing direction Z. It is to be noted that the first region C that is incompletely rubbing aligned is the same as the incompletely rubbing aligned region described in the various embodiments of the array substrate.

Furthermore, according to the graph as shown in FIG. 3 described in combination with the embodiments of the array substrate, a ratio of an area of a region of the common electrode including the strip slits that corresponds to the pixel units, which is occupied by the orthogonal projection of the first region C onto the array substrate, to an area of the first region C decreases as the first angle increases, where the first angle is greater than or equal to 6° and less than or equal to 8°. It is to be noted that the ratio of the area of the region of the common electrode including the strip slits that corresponds to the pixel units, which is occupied by the orthogonal projection of the first region C onto the array substrate, to the area of the first region C is the effective area ratio of the incompletely rubbing aligned region as described in combination with the embodiment of the array substrate in which the pixel electrode is disposed between the common electrode and the substrate.

According to the graph as shown in FIG. 10 in combination with the embodiments of the array substrate, a ratio of an area of a region of the pixel electrode including the strip slits, which is occupied by the orthogonal projection of the first region C onto the array substrate, to an area of the first region C decreases as the first angle increases, where the first angle is greater than or equal to 6° and less than or equal to 8°. It is to be noted that a ratio of the area of the region of the pixel electrode including the strip slits, which is occupied by the orthogonal projection of the first region C onto the array substrate, to the area of the first region C is the effective area ratio of the incompletely rubbing aligned region described in combination with the embodiment of the array substrate in which the common electrode is disposed between the pixel electrode and the substrate.

In embodiments of the disclosure, the display panel is the FFS display panel, in this way the alignment rubbing direction in which the alignment rubbing is performed on the first alignment film layer disposed in the array substrate is the same as the alignment rubbing direction in which the alignment rubbing is performed on the second alignment film layer disposed at a side of the color filter substrate that is close to the array substrate.

As shown in FIG. 16, the display panel further includes a liquid crystal layer 43 between the color filter substrate 41 and the array substrate 42, and the liquid crystal layer 43 is constituted by numerous liquid crystal molecules 431 which are positive liquid crystal molecules.

It is noted that the above display panel may have or may not have a touch function, depending on needs in actual fabrication. The touch function may be implemented as an electromagnetic touch function, a capacitive touch function, an electromagnetic-capacitive touch function or the like.

Figure 18:
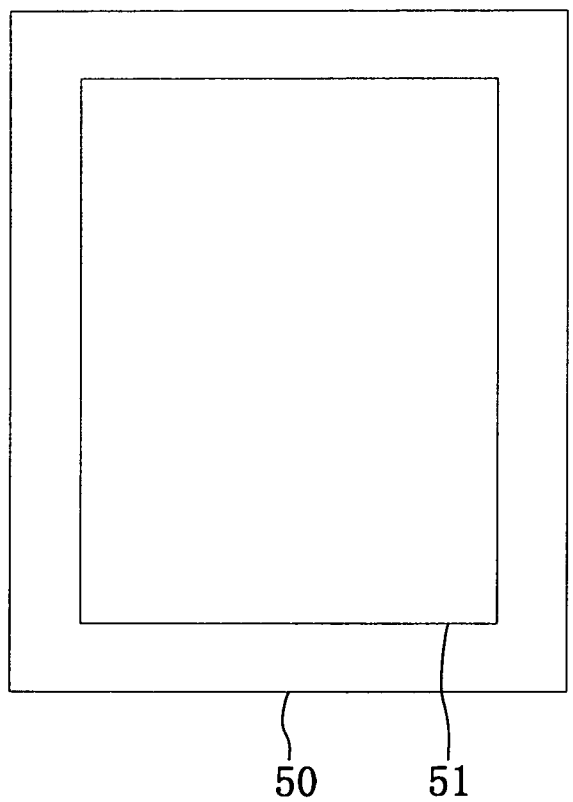
FIG. 18 is a schematic view showing a structure of a display device, according to embodiments of the disclosure.

Embodiments of the disclosure further provide a display device. As shown in FIG. 18 which is a schematic view showing a structure of a display device, according to embodiments of the disclosure, the display device 50 includes a display panel 51, and may also include other components for supporting the normal operation of the display panel 51. The display panel may be the display panel described in the above various embodiments. The display device 50 may be a cell phone, a desktop computer, a laptop computer, a tablet PC, an electronic photo album, electronic paper, or the like.

In the array substrate, the display panel and the display device, according to embodiments of the disclosure, the plurality of strip slits are disposed in the region of the common electrode that corresponds to the pixel unit, where the major axes of a plurality of the strip slits corresponding to the same row of pixel units are parallel to each other, the extension lines of the major axes of the strip slits corresponding to any two adjacent rows of pixel units intersect each other, and a first angle is defined between the major axis of one of the strip slits and a direction perpendicular to the gate lines in the plane comprising the common electrode; or the plurality of strip slits are disposed in the pixel electrode, where the major axes of a plurality of the strip slits in the pixel electrodes at the same row of pixel units are parallel to each other, and the extension lines of the major axes of the strip slits in the pixel electrodes at any two adjacent rows of pixel units intersect each other; and a first angle is defined between the major axis of one of the strip slits and a direction perpendicular to the gate line in the plane comprising the common electrode; and where the first angle is greater than or equal to 6° and less than or equal to 8°, as a result, liquid crystal molecules which are not aligned normally in the display panel can be reduced, and in this way the light leakage phenomenon of the display panel and the display device in a black display state can be alleviated.

The embodiments of the disclosure and the technical principle used therein have been described as above. The disclosure is not limited to the particular embodiments set forth herein, and a variety of apparent alterations, adjustments and replacements can be made by those skilled in the art without departing from the protection scope of the disclosure. In this way, while the disclosure has been explained in detail with reference to the above embodiments, the disclosure is not merely limited thereto. Further embodiments can also be obtained without departing from the scope of the disclosure, and the scope of the disclosure is defined by the appended claims.

Various modifications and additions can be made to the exemplary embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

We claim:

1. An array substrate, comprising:
   a substrate;
   a plurality of gate lines extending in a first direction and a plurality of data lines disposed on the substrate, wherein the plurality of gate lines intersect the plurality of data lines to define a plurality of pixel units arranged in rows and columns; and
   a common electrode disposed above the plurality of pixel units,
   wherein the common electrode is provided with a plurality of strip slits arranged in a plurality of rows, each row corresponds to a respective one row of pixel units, each of the plurality of strip slits consists of one straight portion and one bent portion that is shorter than the one straight portion,
   the plurality of rows of strip slits includes first rows and second rows alternatively arranged, the one straight portion of each strip slit in each first row only extends in a second direction, the one straight portion of each strip slit in each second row only extends in a third direction, the second direction is inclined in a clockwise direction at a first angle with respect to a direction perpendicular to the first direction, the third direction is inclined in a counter-clockwise direction at the first angle with respect to the direction perpendicular to the first direction, and the first angle is greater than or equal to 6° and less than or equal to 8°, wherein two to four strip slits are disposed in one region of the common electrode that corresponds to each of the plurality of pixel units.

2. The array substrate of claim 1, wherein the first angle is greater than or equal to 7° and less than or equal to 8°.

3. The array substrate of claim 1, wherein the first angle is equal to 8°.

4. The array substrate of claim 1, further comprising a plurality of pixel electrodes, which are disposed between the common electrode and the substrate and electrically insulated from the common electrode.

5. The array substrate of claim 1, further comprising a first alignment film layer that is disposed on a surface of the common electrode that is away from the substrate, wherein an alignment rubbing direction of the first alignment film layer is parallel to a direction perpendicular to the plurality of gate lines in a plane comprising the common electrode.

6. The array substrate of claim 1, wherein the strip slits in each first row are distributed in the first direction and are parallel to each other, and the strip slits in each second row are distributed in the first direction and are parallel to each other.

7. The array substrate of claim 1, wherein every adjacent two rows of strip slits are spaced apart by a respective one of the plurality of gate lines.

8. An array substrate, comprising:
a substrate; and
a plurality of gate lines extending in a first direction and a plurality of data lines disposed on the substrate, wherein the plurality of gate lines intersect the plurality of data lines to define a plurality of pixel units that are arranged in a plurality of rows;
wherein each of the plurality of pixel units is provided with a pixel electrode having two to four strip slits, each strip slit consists of one straight portion and one bent portion that is shorter than the one straight portion, the plurality of rows of pixel units comprises first rows and second rows alternatively arranged, the one straight portion of the pixel electrode in each pixel unit in each first row only extends in a second direction, the one straight portion of the pixel electrode in each pixel unit in each second row only extends in a third direction,
the second direction is inclined in a clockwise direction at a first angle with respect to a direction perpendicular to the first direction,
the third direction is inclined in a counter-clockwise direction at the first angle with respect to the direction perpendicular to the first direction, and
the first angle is greater than or equal to 6° and less than or equal to 8°.

9. The array substrate of claim 8, wherein the first angle is greater than or equal to 7° and less than or equal to 8°.

10. The array substrate of claim 8, wherein the first angle is equal to 8°.

11. The array substrate of claim 8, further comprising a planar common electrode, which is disposed between the pixel electrodes and the substrate and electrically insulated from the pixel electrodes.

12. The array substrate of claim 8, further comprising a first alignment film layer that is disposed on the pixel electrodes, wherein an alignment rubbing direction of the first alignment film layer is parallel to a direction perpendicular to the plurality of gate lines in a plane comprising the pixel electrodes.

13. A display panel, comprising a color filter substrate and an array substrate that is disposed opposite to the color filter substrate, wherein the color filter substrate is provided with a first alignment film layer and a support element, the first alignment film layer includes a first region that is incompletely rubbing aligned, the first region is at the periphery of the support element, wherein the array substrate comprises: a substrate; a plurality of gate lines extending in a first direction and a plurality of data lines disposed on the array substrate, wherein the plurality of gate lines intersect the plurality of data lines to define a plurality of pixel units arranged in rows and columns; a common electrode disposed above the plurality of pixel units; and a second alignment film layer disposed on the common electrode, wherein the common electrode is provided with a plurality of strip slits arranged in a plurality of rows, each row corresponds to a respective one row of pixel units, each of the plurality of strip slits consists of one straight portion and one bent portion that is shorter than the one straight portion, the plurality of rows includes first rows and second rows alternatively arranged, the one straight portion of each strip slit in each first row only extends in a second direction, the one straight portion of each strip slit in each second row only extends in a third direction, the second direction is inclined in a clockwise direction at a first angle with respect to a direction perpendicular to the first direction, the third direction is inclined in a counter-clockwise direction at the first angle with respect to the direction perpendicular to the first direction, and the first angle is greater than or equal to 6° and less than or equal to 8°, wherein two to four strip slits are disposed in one region of the common electrode that corresponds to each of the plurality of pixel units.

14. The display panel of claim 13, wherein a ratio of an area of a region of the pixel electrode or of the common electrode that corresponds to the plurality of pixel units, which is occupied by an orthogonal projection of the first region onto the array substrate, to an area of the first region decreases as the first angle increases.

15. The display panel of claim 13, wherein an alignment rubbing direction of the first alignment film layer is the same as an alignment rubbing direction of the second alignment film layer.

* * * * *